United States Patent [19]

Harner et al.

[11] Patent Number: 4,605,982
[45] Date of Patent: Aug. 12, 1986

[54] CONTROL CIRCUIT FOR A CIRCUIT INTERRUPTER

[75] Inventors: Robert H. Harner, Park Ridge; Joseph W. Ruta, Elmhurst, both of Ill.

[73] Assignee: S&C Electric Company, Chicago, Ill.

[21] Appl. No.: 668,110

[22] Filed: Nov. 5, 1984

Related U.S. Application Data

[63] Continuation-in-part of Ser. No. 506,942, Jun. 22, 1983, Pat. No. 4,571,658.

[51] Int. Cl.$^4$ .......................... H02H 3/44; H02H 3/08
[52] U.S. Cl. ........................................ 361/94; 361/87; 361/95
[58] Field of Search ...................... 361/93, 94, 95, 96, 361/87, 97

[56] References Cited

U.S. PATENT DOCUMENTS

| | | | |
|---|---|---|---|
| 3,290,556 | 1/1963 | Graham et al. | 317/36 |
| 3,317,791 | 5/1967 | Price et al. | 317/36 |
| 3,689,801 | 9/1972 | Engel et al. | 361/96 |
| 3,713,005 | 1/1973 | Engel | 361/96 |
| 3,831,061 | 9/1974 | Boyd | 317/36 |
| 4,000,446 | 12/1976 | Vandevier et al. | 317/36 |
| 4,017,766 | 4/1977 | Vercellotti et al. | 361/83 |
| 4,149,210 | 4/1979 | Wilson | 361/95 |
| 4,203,142 | 5/1980 | Lee | 361/87 X |
| 4,258,403 | 3/1981 | Shimp | 361/96 X |
| 4,297,741 | 10/1981 | Houell | 361/96 X |
| 4,345,292 | 8/1982 | Jaeschke et al. | 361/94 |
| 4,347,541 | 9/1982 | Chen et al. | 361/50 |
| 4,380,785 | 4/1983 | Demeyer | 361/96 |
| 4,393,431 | 7/1983 | Gilker | 361/97 |
| 4,442,472 | 4/1984 | Panz et al. | 361/96 |
| 4,567,540 | 1/1986 | Ruta | 361/93 |

FOREIGN PATENT DOCUMENTS

1436861 5/1976 United Kingdom .

OTHER PUBLICATIONS

"Pyrister", Carbone Ferraz Inc.
C. Bottger, Ratingen, "The Application of I$_s$-Limiters in Three Phase Systems" Color-Emag Elekrizitats-Aktiengesellshaft D-403 Ratingen.
"Fault Levels Too High?", Calor Emag Leaflet No. 119716e.
M. C. Blythe, "Limiting Fault Currents Between Private and Public Networks", Calor-Emag Elekrizitats-Aktiengesellschaft.
N. Miyoshi & O. Fukushima, "Ultra-High Speed Protection Device-Fuji Ultrup Fuse", Fuji Electric Review, UOC 6L1.316.932.2, vol. 18, No. 1.
T. Keders & A. Leibold, "A Current-Limiting Device for Service Voltages up to 34.5 kV", presented at the IEEE PES Summer Meeting, Portland, OR, Jul. 18-23, 1976.
"Prototype Fault Current Limiter", EPRI, EPRI EL-1396, Projects 281-2,-4, Final Report, May 1980, title page through pp. 2-3, and pp. 7-1 to 7-19, and 8-1.
P. J. Kroon & W. N. Rothenbuhler, "The Development and Application of 69-kV Fault Current Limiter", 7th IEE/PES Transmission and Distribution Conference and Exposition, Apr. 1-6, 1979.
J. Wafer, "The Impack of Solid-State Technology on Molded Case Circuit Breakers" IEEE Transactions on Industry Applications, vol. 1A-16, No. 5, Sep./Oct. 1980.

*Primary Examiner*—A. D. Pellinen
*Assistant Examiner*—Derek S. Jennings
*Attorney, Agent, or Firm*—James V. Lapacek

[57] ABSTRACT

A control circuit is provided for operating a circuit interrupter in response to overcurrent in an alternating-current line in which the circuit interrupter is located. The control circuit includes a transducer for producing output current proportional to the current in the line. A time-current trip signal generator circuit responds to output current representative of moderate overcurrent in the line by producing a trip signal after the passage of a time period that is inversely related to the overcurrent. An instantaneous trip signal generator circuit produces a trip signal after a predetermined time interval in response to output current between a minimum and maximum magnitude and increasing at a rate greater than a selected rate, which conditions indicate the presence of high overcurrent in the line. In the preferred arrangement, the predetermined time interval is measured from the time that the rate of change of the current exceeds a predetermined rate. Accordingly, when the onset of high overcurrent is detected, the current is interrupted with a minimum possible delay while substantially reducing undesired response to noise and false signals.

16 Claims, 3 Drawing Figures

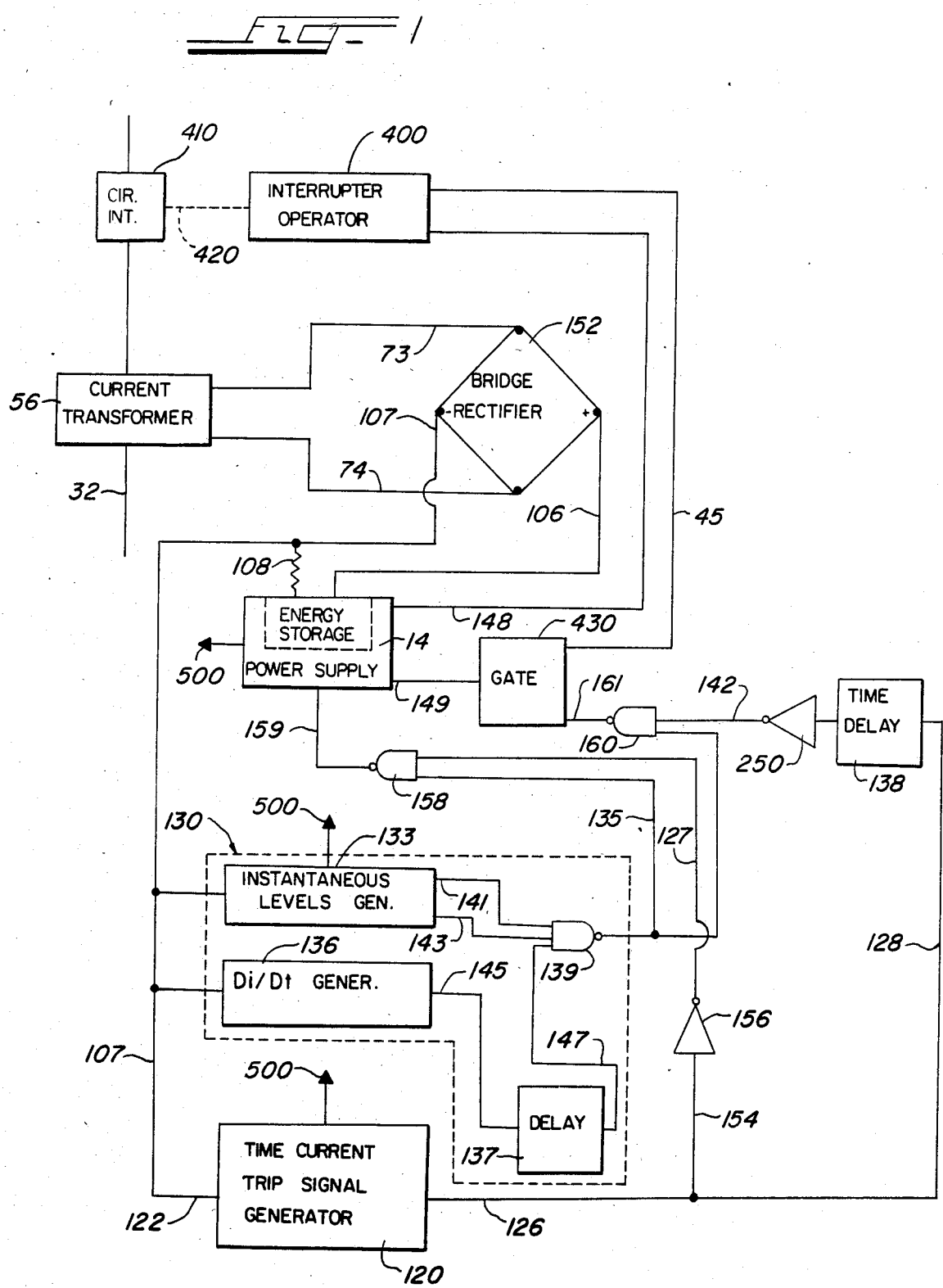

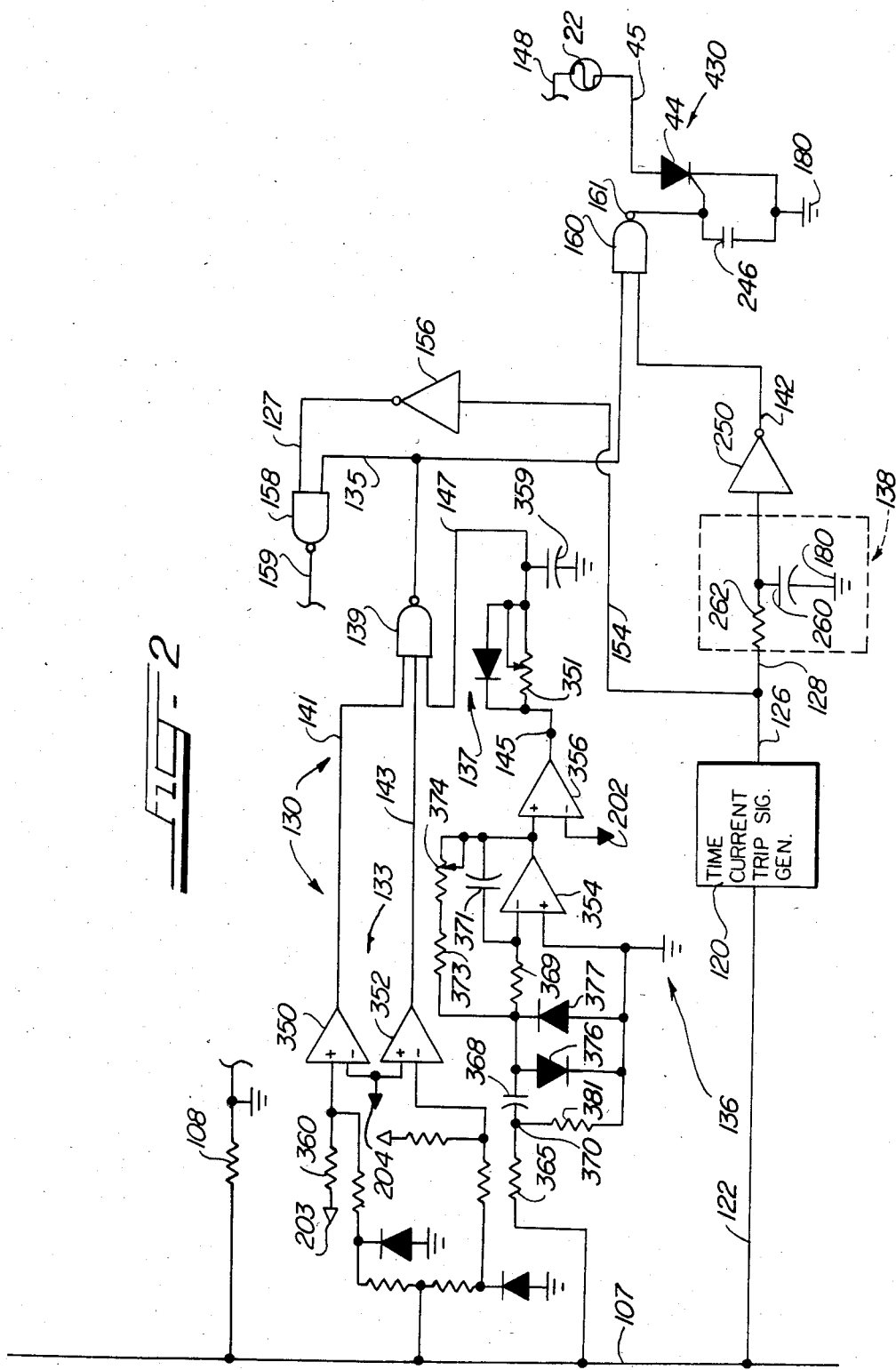

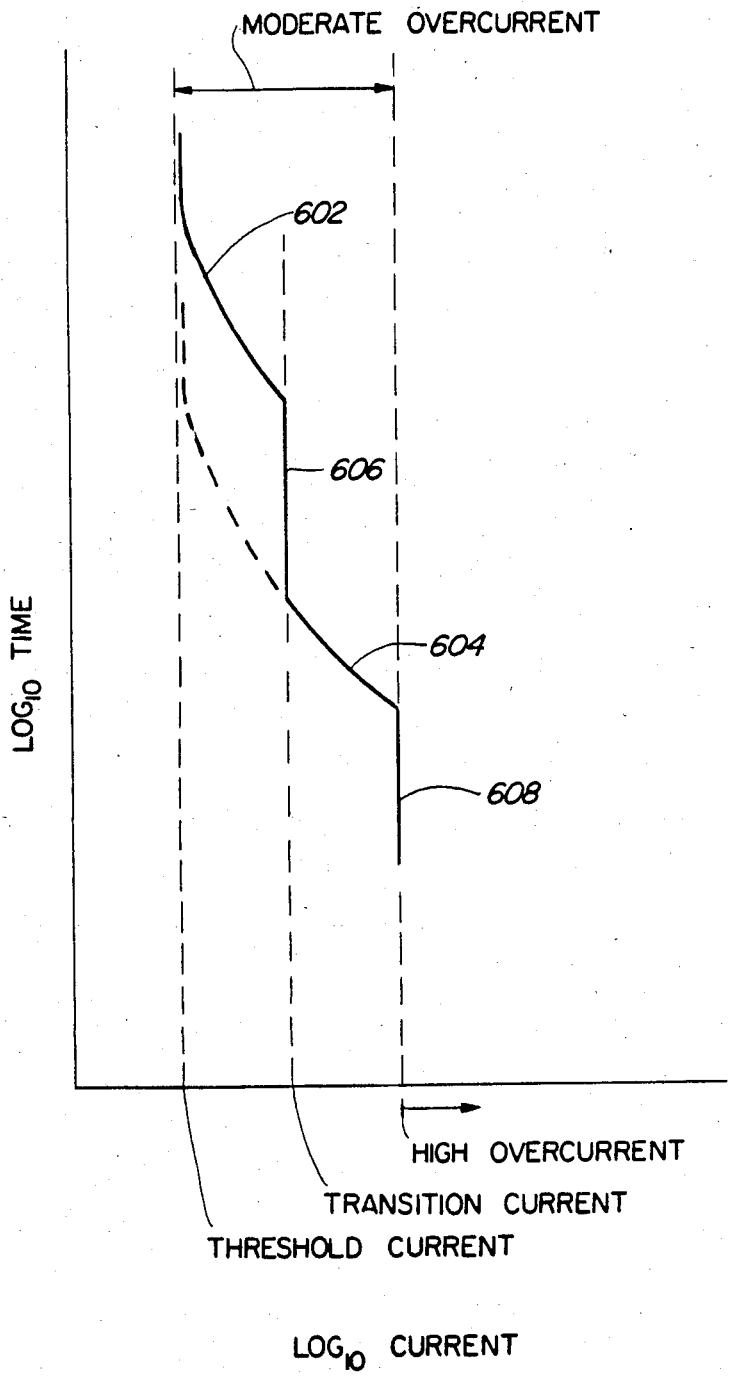

CONTROL CIRCUIT FOR A CIRCUIT INTERRUPTER

CROSS REFERENCE TO RELATED APPLICATIONS

The present application is a continuation-in-part application of co-pending U.S. application Ser. No. 506,942 filed on June 22, 1983 and is directed to improvements of the subject matter disclosed and claimed in co-pending U.S. application Ser. Nos. 506,942 and 506,944, filed on June 22, 1983, now U.S. Pat. Nos. 4,571,658 and 4,567,540, and co-pending U.S. application Ser. No. 658,239 filed on Oct. 3, 1984; all of these applications assigned to the assignee of the present application.

BACKGROUND OF THE INVENTION

1. Field of the Invention

The present invention relates to a control circuit for a circuit interrupter, and, more specifically, to a control circuit for selectively causing a circuit interrupter to operate in response to overcurrent in an alternating-current line in which the circuit interrupter is located. As used herein, "overcurrent" means current exceeding a threshold value.

2. Description of the Prior Art

Some prior art protective devices, such as fuses, circuit breakers, circuit switchers, and reclosers, may operate according to an inverse time-current relationship. Specifically, the higher the level of overcurrent in a line, the more quickly the protective device operates. Conversely, the lower the level of overcurrent in the line, the more slowly the protective device operates. Some prior art protective devices also respond to overcurrent in the line "instantaneously," that is, with minimum or no time delay after the inception of overcurrent in the line.

For example, the following publications are directed to arrangements involving instantaneous trip signal generation:

T. Keders et al, "A Current-Limiting Device for Service Voltages Up To 34.5 kV", pages 1–7, July 18, 1976, IEEE PES Summer Meeting, Paper No. A 76 436-6;

C. Bottger, "The Application of $I_s$-Limiters in Three Phase Systems", pages 1–7, 1967, Calor-Emag Company, Germany;

Calor Emag Company, Leaflet No. 1197/6E, "Fault Levels Too High?", 2 pages, date unknown;

M. C. Blythe, "Limiting Fault Currents Between Private and Public Networks", 4 pages, Oct. 5, 1973, reprinted from Electrical Review, Calor-Emag;

N. Miyoshi et al, "Ultra-High Speed Protection Device—Fuji Ultrup Fuse", pages 47–51, Vol. 18, No. 1, Fuji Electric Review;

P. J. Kroon, "The Development and Application of a 69-kV Fault Current Limiter", pages 237–244, Apr. 1, 1979, 7th IEEE/PES Transmission and Distribution Conference and Exposition;

J. Wafer, "The Impact of Solid-State Technology on Molded Case Circuit Breakers", pages 605–611, Sept. 10, 1979, Vol. 1A–16, No. 5, September/October 1980, IEEE Transactions on Industry Applications;

"Pyristor Pyrotechnic Systems", Carbone Ferraz, Inc. brochure;

"Prototype Fault Current Limiter", EPRI Report, EL-1396, May 1980, Palo Alto, Calif.;

The Wafer article discusses the generation of various TCC (time-current characteristic) curves for circuit breakers and is operated in various trip modes including a long delay $i^2t$ time characteristic, an instantaneous mode, and a short time delay mode. The Miyoshi et al article also uses $i^2t$ as a criterion.

The remaining references listed in this category relate to various protection devices using di/dt as a criterion for operation.

For example, the EPRI report, EL-1396, and the Kroon article are directed to a fault current limiter that combines di/dt sensing in conjunction with time delay to prevent tripping on transients such as lightning or capacitor switching surges. The EPRI report, Section 7, at pages 7-4 and 7-8 and in FIG. 7-3, relates to a circuit having an RC timer that is initiated by the sensed current exceeding an I pickup current. A di/dt signal controls the RC timer so as to disable or reset the timer if the di/dt falls below a selected level. Similarly, the timer is reset if the current falls below the I pickup current. The report determines that the di/dt must exceed a specified level for a finite period of time (0.4 msec for the cases studied) to effectively filter out transients without seriously increasing the sensing time. The circuit in FIG. 7-3 describes the two transistors responsive to the di/dt signal and the I pickup signal as providing an AND gate.

The Blythe reference discusses an installation of a Calor Emag $I_s$ limiter which utilizes di/dt sensing. If the selected di/dt value is exceeded, the current limiter is permitted to operate if the current is between a lower limit $I_2$ and an upper limit $I_1$. The value of $I_2$, the lower limit, is set so that the current limiter is not operative at the initiation of the fault when higher frequency currents might give it a false signal. The current level $I_1$, the upper limit, is set to ensure an effective limitation of short circuit current.

The Carbone Ferraz brochure discusses various aspects of fault current protection devices such as di/dt sensing and, in a detailed description, "Current Limiting Function", starting on page 9, describes various time periods of operation such as the time TS required to reach the triggering current, the time TF required for analyzing the supplied signal and sending an electronic trip signal, the time TR for the mechanical response time, and the time TP for the fuse pre-arcing time.

The following patents are directed to current sensing and fault interrupting arrangements that include various combinations of short, long and instantaneous sensing and trip signal circuits, the various circuits providing diverse time current characteristics:

U.S. Pat. No. 3,831,061 to Boyd;
U.S. Pat. No. 4,442,472 to Pang;
U.S. Pat. No. 4,017,766 to Vercellotti et al;
U.S. Pat. No. 4,000,446 to Vandevier et al;
U.S. Pat. No. 4,347,541 to Chen et al;
U.S. Pat. No. 4,149,210 to Wilson;
U.S. Pat. No. 3,290,556 to Graham et al;
U.S. Pat. No. 3,317,791 to Price et al;
British Pat. No. 1,436,861;
U.S. Pat. No. 4,380,785 to Demeyer et al; and
U.S. Pat. No. 4,393,431 to Gilker.

While the aforementioned arrangements are generally suitable for their intended purposes, it is an object of the present invention to provide a control circuit that operates according to an instantaneous relationship, the relationship being defined by the rate of change of the current exceeding a predetermined value for a predetermined time, and the instantaneous current at the expiration of the predetermined time being above a lower limit and below a higher limit.

It is another object to provide a control circuit that operates according to an instantaneous relationship wherein a trip signal is generated based on the rate of change of the current exceeding a predetermined value for a predetermined time interval.

Yet another object of the present invention is to provide a versatile control circuit that may be used to control the operation of or otherwise affect a wide variety of devices other than circuit interrupters.

Still another object to the present invention is to provide a control circuit for use with a current interrupter or other device and having both a time-current relationship and an instantaneous relationship that provides a desirable combination of minimum operating times and false signal immunity, matches the damage curves of equipment connected to a line, and coordinates with other protective devices in the line.

SUMMARY OF THE INVENTION

With the above and other objects in view, the present invention relates to a control circuit for causing operation of a circuit interrupter or other device in response to, and a selected time after the onset of, moderate overcurrent in an alternating-current line and for causing operation of the circuit interrupter or other device substantially instantaneously with the onset of high overcurrent in the line. As described more fully below, current in the alternating-current line may be interrupted when the onset of high overcurrent is detected, with a minimum possible delay while providing desirable noise immunity, and may be interrupted according to an inverse time-current relationship when a moderate overcurrent is detected. The trip signals produced by the control circuit of the present invention may also be used, for example, to operate or otherwise effect devices such as circuit breakers, reclosers, circuit switchers, alarms, and the like.

The control circuit of the present invention may include a transformer and rectifier, or other suitable transducers, which produce an output current proportional to the current in the line being protected; a power supply having an energy storage circuit; a time-current trip signal generator circuit; an instantaneous trip signal generator circuit; and a switch or gate for applying to the circuit interrupter or other device the energy stored in the energy storage circuit of the power supply. Additionally, the circuit of the present invention may include a time-delay circuit for coordinating the operation of the energy storage circuit and the switch in response to a trip signal from the time-current trip signal generator circuit.

The power supply for the control circuit can be of the type described and claimed in the co-pending U.S. patent application Ser. No. 506,944, entitled "Power Supply for a Circuit Interrupter," assigned to S&C Electric Company, or any other suitable type. The power supply must power-up the control circuit of the present invention and store energy sufficient to reliably cause operation of the circuit interrupter or other device. Energy stored in the power supply may fall within two ranges: a first, lower range, to power the control circuit during normal operation; and a second, higher range to cause operation of the circuit interrupter or other device in response to a trip signal from the time-current trip signal generator.

The time-current trip signal generator circuit can be of the type described and claimed in co-pending U.S. patent application Ser. No. 658,239, entitled "Trip Signal Generator for a Circuit Interrupter," also assigned to S&C Electric which responds to output current signals representative of moderate overcurrent in the line to produce a trip signal after a time delay following the onset of overcurrent. The time delay is inversely realted to the overcurrent in the line.

The instantaneous trip signal generator is generally similar to the type described and claimed in co-pending U.S. application Ser. No. 506,942, entitled "Control Circuit for a Circuit Interrupter," also assigned to S&C Electric Company. The instantaneous trip signal generator of the present invention comprises a level detector circuit for detecting the instantaneous value of the current in the line and a circuit for detecting the rate of change of the current in the line. The instantaneous trip signal generator of the present invention produces a trip signal after a predetermined time delay in response to output current signals representing current in the line having an instantaneous value within a "window" (i.e., greater than a first selected level and less than a second, higher selected level) and having a rate of change greater than a selected rate. The instantaneous trip signal generator in a preferred arrangement initiates the predetermined time delay when the rate of change exceeds the selected rate. Also in the preferred arrangement, the time delay circuit is reset when the sensed rate of change of the current drops below the selected rate. In a preferred arrangement, the time-current trip signal generator also includes a time-delay circuit that operates only on trip signals generated by the time-current trip signal generator circuit in order to permit the power supply to increase the amount of energy stored in the energy storage circuit to within a range sufficient to ensure reliable operation of the circuit interrupter or other device.

BRIEF DESCRIPTION OF THE DRAWINGS

FIG. 1 is a block diagram of the control circuit of the present invention;

FIG. 2 is a partial schematic block diagram of the present invention showing the instantaneous trip signal generator circuit in greater detail; and FIG. 3 is a generalized curve representing the relationships between time and current that will cause a trip signal to be generated by the control circuit of the present invention.

DETAILED DESCRIPTION OF THE INVENTION

Referring to FIG. 1, the present invention relates to a control circuit 16 that applies energy to a device, such as an interrupter operator 400, a selected time after the onset of certain levels of overcurrent in a line 32. The duration of this time delay depends upon the level and other characteristics of the overcurrent and upon the operating characteristics of the control circuit 16, as described below. The application of sufficient energy to the interrupter operator 400 effects the operation thereof, which in turn may cause the operation of a circuit interrupter 410 in the line 32, as illustrated schematically by the dashed line 420. The interrupter operator 400 may be a solenoid; a relay, or, as described below, a power cartridge 22. The interrupter operator 400 also may be, or operate, for example, an alarm.

The control circuit 16 may include a current transformer 56 and a fullwave bridge rectifier 152 which produce, on outputs 106 and 107 of the rectifier 152, current signals proportional to the current in the line 32. As one skilled in the art would recognize, suitable means other than the current transformer 56 and the rectifier 152 may be used to provide signals proportional to the current in the line 32.

The control circuit 16 also includes a power supply 14, such as that described in the above-referenced Appliction entitled "Power Supply for a Circuit Interrupter," a time-current trip signal generator 120, such as that described in the above-referenced Application entitled "Trip Signal Generator for a Circuit Interrupter," and an instantaneous trip signal generator 130, described herein.

As described more fully in the foregoing application entitled "Power Supply for a Circuit Interrupter," the power supply 14 includes an energy storage circuit connected to the outputs 106 and 107 for storing energy derived from the current signals thereon. The power supply 14 further contains a switch circuit and a control circuit which maintain the amount of energy stored in the energy storage circuit within a first range until such time as when tripping is required. The stored energy powers a regulated power supply, which supplies operating power to other portions of the control circuit 16, as generally shown at 500 in FIG. 1. Stored energy within the first range is generally insufficient to reliably operate the interrupter operator 400. When required, energy within the second range is stored in the energy storage circuit of the power supply 14 only on an "as needed" basis, i.e., only when operation of the circuit interrupter 410 by the energy storage circuit is required. This enables the power supply 14 to operate within a lower energy range during steady state (non-overcurrent) conditions, which lengthens component life and improves circuit accuracy.

The current range over which the control circuit 16 of the present invention operates is illustrated in FIG. 3. What is termed herein "moderate" overcurrent includes current of a magnitude greater than a predetermined threshold value and less than that of a "high" overcurrent. Overcurrent of a magnitude higher than the threshold and lower than a transition is referred to herein as "low moderate" overcurrent. Overcurrent of a magnitude higher than the transition and lower than high overcurrent is referred to herein as "high moderate" overcurrent.

As described more fully in the above-referenced application entitled "Trip Signal Generator for a Circuit Interrupter," the time-current trip signal generator 120 responds to current signals from the rectifier 152 which represent moderate overcurrents in the line 32. As illustrated in FIG. 1, an input 122 of the first trip signal generator circuit 120 is coupled to the rectifier 152 via output 107 and receives therefrom current signals proportional to the current in the line 32. When the time-current trip signal generator 120 receives a current signal on its input 122 representing moderate overcurrent in the line 32, it applies a trip signal to an output 126 thereof after the passage of a time period inversely proportional to the difference between the overcurrent and the threshold current. The start of the time delay is coincident with the onset of overcurrent in the line 32.

As described in that application, and as shown in FIG. 3 hereof, the time-current trip generator 120 may include a range selector for providing a different time-current characteristic for low-moderate overcurrents and high-moderate overcurrents. Thus, the time delay may very inversely with low-moderate overcurrents according to a first portion 602 of a time-current curve, and may vary inversely with high-moderate overcurrent according to a second portion 604 of the time-current curve.

An instantaneous trip signal generator 130, which may be used in conjunction with time-current trip signal generator 120, also responds to current signals on the output 107 by indicating the onset of high overcurrent in the line 32, and "instantaneously" applying a trip signal to an output 135 thereof. High overcurrent in line 32 is predicted by the use of two criteria implemented by the instantanteous trip signal generator 130, as explained more fully below. The time at which the instantaneous trip signal generator 130 applies a trip signal to its output 135 may nearly coincide with the onset of a high overcurrent. In this manner, high overcurrents may be interrupted in time to minimize damage to the line 32 and its associated equipment, and before such overcurrent has increased to a level that is beyond the capability of the circuit interrupter 410 to interrupt.

A time-delay circuit 138 delays a trip signal from the time-current trip signal generator 120 by delaying operation of the gate 430 until the energy stored in the energy storage circuit of power supply 14 is increased to within the second range that is necessary to operate reliably the interrupter operator 400. After the time delay, the gate 430 is operated to apply the increased stored energy to the interrupter operator 400. Thus, for moderate overcurrents, to which the time-current trip generator 120 responds and for which the current signal produced on the output 106 will be insufficient to operate reliably the interrupter operator 400, the time-delay circuit 138 ensures that increased energy is stored in the energy storage circuit of the power supply 14 before the gate 430 is operated.

As illustrated in FIG. 1, path 148 runs from one side of the power supply 14 to one side of the interrupter operator 400; path 45, the gate 430, and the path 149 runs from the other side of the interrupter operator 400 and the other side of the power supply 14. When the gate 430 is operated by the time-delay circuit 138, a current path 148–149 through the interrupter operator 400 is completed and energy stored in power supply 14 as well as the current in the output 106 is applied to the interrupter operator 400 via paths 148 and 149.

As noted above, energy within the first range is normally stored in the energy storage circuit of the power supply 14 and is insufficient to operate the interrupter operator 400. When a trip signal is generated on the output 135 of the instantaneous trip signal generator 130 in response to its detection of the onset of high overcurrent in the line 32, the switch circuit in the power supply 14 applies the current signal in the output 106 to the path 148 at approximately the same time that the gate 430 is operated by the trip signal. Even though, at the time of operation of the gate 430, the amount of energy stored in the power supply 14 is itself insufficient to operate the interrupter operator 400, the application of the current signals in the output 106 is sufficient to operate reliably the interrupter operator 400.

The power supply 14 utilizes stored energy within the first range to energize control circuit 16, as shown at 500, to detect and respond to overcurrent in the line 32. If the circuit interrupter 410 and the control circuit 16 are initially connected in line 32 with the current therein below the threshold current, power supply 14 begins to store energy derived from the current signals on the output conductors 106 and 107. At some point, sufficient energy below the first range is stored to achieve proper "power up" of the circuit 16 so that it can accurately determine, via operation of the circuits 120 and 130, the condition of the current in the line 32. Following this, as the circuit 16 operates during steady state (non-overcurrent) conditions, the energy stored in the power supply 14 remains within the first range.

However, if the circuit interrupter 410 and the control circuit 16 are initially connected in line 32 carrying overcurrent, other considerations come into play. First, the interrupter operator 400 cannot be immediately operated because circuits 120 and 130 must first determine if the overcurrent in the line 32 is a moderate overcurrent or is a predicted high overcurrent. To predict whether the overcurrent will be high, the circuit 130 must determine whether the instantaneous magnitude of the current is greater than a first value and less than a second value, and whether the rate of change of the current is greater than a predetermined rate. For these determinations to be properly made, the control circuit 16, and especially the instantaneous trip generator 130, must be appropriately "powered up." The power supply 14 is configured to achieve this quick "power up" of the control circuit 16 and instantaneous trip generator 130.

The interruption of high overcurrents at their onset is considered by the instantaneous trip signal generator 130, which responds to high overcurrent before the time-current trip signal generator 120. If the instantaneous trip signal generator circuit 130 does not initiate operation of the interrupter operator 410 because the overcurrent exceeded the second value, the control circuit 16 continues to operate and the instantaneous trip signal generator 130 continues to monitor overcurrent. Since the overcurrent is sinusoidal, later during the same or another cycle of the overcurrent, the rate of change and instantaneous value criteria are met.

When the time-current trip signal generator circuit 120 generates a trip signal (i.e., a high logic state) on its output 126, the trip signal is applied to the time-delay circuit 138 via path 128 and to inverter 156 via path 154 and thence to one input 127 of a gate 158, which may be a NAND gate. The output 135 of the second trip signal generator circuit 130 is connected to the other input of the NAND gate 158. When neither trip signal is present on outputs 126 or 135, a high signal is applied to both inputs of the NAND gate 158. Accordingly, there is normally a low signal present on the output 159 of the NAND gate 158, which is applied to the power supply 14.

Should a high signal on the output 159 of the NAND gate 158 be applied to the power supply 14, the switch circuit of the power supply 14 is operated, regardless of the amount of energy stored in the energy storage circuit of the power supply 14. Thus, a high signal appears on the output 159 of the NAND gate 158 whenever a high signal, representative of a trip signal, appears on the output 126 or whenever a low signal, representative of a trip signal, appears on the output 135.

The output 135 of the instantaneous trip signal generator circuit 130 is also connected to one input of a 2-input NAND gate 160. The output path 142 of the time-delay circuit 138 is connected to the other input of the NAND gate 160. When the output 135 of the instantaneous trip signal generator 130 is high and the output 126 of the time-current trip signal generator 120 is low, a high signal is present on each input of the NAND gate 160. This represents the normal situation and no trip signal is generated. Accordingly, a low signal is normally present on the output 161 of NAND gate 160. Accordingly, the normally blocked gate 430 remains in the blocked state. A high signal on the output 161 results in the gate 430 being operated thereby connecting the interrupter operator 400 to the power supply 14 via conductors 148, 45, and 149. Such a high signal on the output 161 is produced when a high signal is present on the output path 126 or a low signal is present on the output path 135, as occurs when either circuit 120 or 130 generates a trip signal.

When the time-current trip signal generator 120 generates a trip signal on its output 126, this signal is applied to one input of the NAND gate 158 via inverter 156 and to the time-delay circuit 138. For purposes of the present discussion, it is assumed the trip signal is applied to the NAND gate 158 in the form of a low signal (due to operation of an inverter 156), which causes the output of the gate 158 to become a high signal. This high signal is fed to the power supply 14 causing the energy storage circuit of the power supply 14 to store therein energy within the second range. The high signal applied to input 128 is delayed by the time-delay circuit 138 and is thereafter applied as a low signal to input 142 of the NAND gate 160. The application of a low signal (due to operation of an inverter 250) to the NAND gate 160 causes its output to become a high signal, which is utilized via its output 161 to operate the gate 430 so as to electrically connect conductors 45 and 149. During the time delay caused by the time-delay circuit 138, energy in the second range has been stored in the energy storage circuit of the power supply 14 and closure of the gate 430 results in operation of interrupter operator 400, circuit interrupter 410, and the interruption of current in line 32.

When the instantaneous trip signal generator circuit 130 applies a trip signal to its output 135, the trip signal, in the form of a low signal is applied to the gates 158 and 160. This nearly simultaneously causes operation of the gate 430 and the switch circuit of the power supply 14. In this event, although the power supply 14 was not permitted to store energy in the second level therein, as described previously, when the gate 430 is closed, the current signals on the outputs 106 and 107 are sufficiently large to directly and immediately operate interrupter operator 400.

In accordance with important aspects of the preferred embodiment of the present invention, the instantaneous trip signal generator 130 includes an instantaneous levels generator 133, a rate of change (di/dt) generator 136, a time delay stage 137, and a 3-input NAND gate 139. The instantaneous levels generator 133 is responsive to the current signals on the output 107 to provide, at outputs 141 and 143, signals representing whether or not the magnitude of the instantaneous current is greater than the first value and less than a second value as discussed hereinbefore. If the instantaneous current is less than the first value, the signal at 143 is low. On the other hand, if the instantaneous current is greater than the first value, the signal at 143 is high. The output 141 is high if the instantaneous current is below the second value and is low if the instantaneous current is above the second value. Accordingly, both outputs 141 and 143 are high only when the sensed current is above the first level and below a second level. The rate of change generator 136 provides a high at an output 145 when the rate of change of the current is greater than the predetermined rate. The output 145 is connected to the input of the time delay stage 137. The time delay stage 137 provides an output at 147 that goes high after a short, predetermined time delay in response to the input 145 going high. The outputs 141, 143 and 147 are each connected to one respective input of the NAND gate 139. Accordingly, the output 135 of the gate 139 goes low to provide a trip signal when the rate of change of the instantaneous current exceeds the predetermined rate for a predetermined delay time and the magnitude of the instantaneous current is greater than the first value and less than the second value. Such a combination of factors is advantageous to provide the maximum immunity from noise and false signals that may be present on the input 107, such as due to capacitor bank transients, while minimizing the overall time of operation or delay for early tripping in response to an overcurrent. In the preferred arrangement, the time delay stage 137 continues to supply a high signal at 147 after the predetermined time delay as long as the di/dt signal at 145 remains high. Accordingly, the trip signal at 135 can be provided after the expiration of the time delay. For example, if the instantaneous signals at 141 and 143 are not both high at the expiration of the time delay, the trip signal at 135 will not be generated upon the expiration of the time delay. However, if the di/dt signal at 145, after the expiration of the time delay, remains high continuously until such time as the instantaneous current assumes a value between the first and second levels, a trip signal will be generated at 135.

Referring now to FIG. 2, the gate 430 may be an SCR 44 in series with the input 45 of a power cartridge 22, which may be the specific form of the interrupter operator 400. The gate 430 may be connected to the energy storage circuit of the power supply 14 via path 149. The control electrode of the SCR 44 is connected to the output 161 of the NAND gate 160. A capacitor 246 is connected between the circuit common 180 and the control electrode of the SCR 44. When a high signal is applied at 161 to the control electrode of the SCR 44, the SCR 44 is turned "on." With the SCR 44 "off," the energy in power supply 14 and the current signals in the output 106 cannot ignite the power cartridge 22 because the ignition path (shown as 148, 45, 149 in FIG. 1) is discontinuous. With the SCR 44 turned "on," the ignition path 148 is continuous and the energy in power supply 14 and the current signals in the output 106 is applied to the power cartridge 22.

If current below the threshold is flowing in the line 32, the signal present on the output 126 of the time-current trip signal generator circuit 120 is a low signal. This low signal is applied to the time-delay circuit 138 via path 128, is inverted to a high signal by inverter 250, and is transmitted to one input of NAND gate 160 via path 142. This low signal is also applied to inverter 156 via path 154, and the resultant high signal is transmitted to one input of NAND gate 158 through path 127. Furthermore, a high signal is normally present on the output 135 of the circuit 130. This high signal is applied to the other inputs of the NAND gates 158 and 160. Thus, with current below the threshold in the line 32, each NAND gate 158 and 160 has applied to both inputs a high signal. As a consequence, during steady state, the outputs 159 and 161 of the NAND gates 158 and 160 have a low signal thereon. The low signal normally on the output 161 of the NAND gate 160 holds the SCR 44 "off." Accordingly, the ignition path for the power cartridge 22 is open.

If moderate overcurrent is in the line 32, after the time period which is inversely proportional to the difference between the overcurrent and the threshold current, a high signal appears on the output 126. This high signal, which is the trip signal of circuit 120, is applied to both inverters 250 and 156. The high signal applied to the inverter 156 is converted thereby to a low signal, which is thereafter applied (along 127) to one input of the NAND gate 158. As a conseqeuence, the output 159 of the NAND gate 158 carries a high signal. As described in the aforementioned U.S. application Ser. No. 506,944, the application of this high signal permits the power supply 14 to store energy within at the second range and is capable of reliably igniting the power cartridge 22. Because it takes some time for the power supply 14 to store the second range of energy, it is necessary to delay conduction of the SCR 44. To this end, the high signal on the output 126 of circuit 120 is not applied directly to the inverter 250, but is rather first delayed by the time-delay circuit 138.

The time-delay circuit 138 includes a capacitor 260 and a resistor 262. The resistor 262 is connected between the input of the inverter 250 and the output 126. The capacitor 260 is connected from the input of the inverter 250 to circuit common 180. The length of time that the high signal on the output 142 is delayed by the time-delay circuit 138 is sufficient to permit the energy in the power supply 14 to reach the second range. Thereafter, the high signal is converted by the inverter 250 to a low signal, which is applied to one input of the NAND gate 160. As a consequence, the output 161 of the NAND gate 160 becomes a high signal, which is applied to the control electrode of the SCR 44 to complete the ignition of the power cartridge 22 and causing the interruption of moderate fault current in line 32.

If high overcurrent occurs in line 32, as defined by the criteria of the instantaneous trip signal generator circuit 130, the high signal normally on its output 135 becomes a low signal. This low signal is applied simultaneously to one input of both NAND gates 158 and 160. Such application of a low signal to the NAND gate 160 immediately effects application of the high signal to the control electrode of the SCR 44 and, accordingly, immediately closes the SCR 44 to complete the ignition path between the power cartridge 22 and the power supply 14. The low signal applied to one input of the NAND gate 158 transmits a high signal to power supply 14 by path 159 and causes the current signals present on the output 106 to ignite the power cartridge 22.

Referring to FIG. 2, the instantaneous trip signal generator circuit 130 includes four operational amplifiers 350, 352, 354 and 356, 3-input NAND gate 139, and the time-delay stage 137 formed by a resistor 357 and a capacitor 359. The operational amplifiers 350 and 352 are each used as level detectors and together form a "window detector." The operational amplifier 354 is utilized as a differentiating amplifier, and the operational amplifier 356 is utilized as a level detector.

As one skilled in the art would recognize, a low signal is provided at the output 135 of gate 139 only when the operational amplifiers 350 and 352 simultaneously produce high signals at respective outputs 141 and 143 in combination with a high level at 147 from the time-delay stage 137. Operational amplifiers 350 and 352 operate as a "window detector" and define the upper and lower values of current to which the instantaneous trip signal generator circuit 130 will respond. Operational amplifier 356 operates as a level detector and, in conjunction with operational amplifier 354, defines the rate of change of the current in line 32 which will cause the amplifier 356 to produce a high signal to the time-delay stage 137. The outputs 141 and 143 of the operational amplifiers 350 and 352 along with the output 147 of the time-delay stage 137 operate as three inputs to the NAND gate 139 to provide a logical "AND" function. If the output of any of the operational amplifiers 350, 356, or 352 is low, a high signal is applied at 135 to one input of NAND gate 158.

The output 141 of the operational amplifier 350 is high if the current in the line 32 is below a maximum value, as defined by the voltage of its constant reference voltage 204 and the resistance of the associated resistors. If, however, the current in line 32 exceeds that value, the output 141 of the operational amplifier 350 goes low and the output 135 is a high output signal. The output 143 of the operational amplifier 352 is low as long as current in the line 32 is below a minimum current value, as determined by the voltage of its constant voltage source 204 and the resistance of the associated resistors. Should the current in the line 32 exceed the minimum value as determined by the reference voltage and associated resistors of operational amplifier 352, the output 143 of the operational amplifier 352 goes high. Should the output 143 of the operational amplifier 352 go high but the output 141 of the operational amplifier 350 be low, the low signal present on the output 141 of the operational amplifier 350 causes the output 135 of the gate 139 to be a high. Accordingly, operational amplifiers 350 and 352 determine a "window" for the minimum and maximum current values in the line 32 to which the interrupting device will respond.

The operational amplifier 354 is used as a differentiating amplifier. The voltage on the output of the operational amplifier 354 is proportional to the instantaneous rate of change of the voltage signals at the node 370 with respect to time. Voltage is present on the output of the operational amplifier 354 regardless of the magnitude of current in the line 32. However, as the rate of change of the voltage signal at the node 370 (which is proportional to di/dt of current in the line 32) increases, the output of the operational amplifier 354 also increases.

The operational amplifier 356 is used as a level detector to compare the voltage on the output of the operational amplifier 354 with the voltage of constant reference 202. When the rate of rise of the signals present on input 107 exceeds the selected rate, the output of the operational amplifier 354 becomes greater than the voltage applied to the inverting input of the operational amplifier 356 and the normally low output at 145 of amplifier 356 goes high. When the output 145 of the operational amplifier 356 is low, the output 147 of the time-delay stage 137 is also low, and the output 135 of the gate 139 is high. Accordingly, the output 135 is low to generate a trip signal if the rate of change signal at 145 exceeds the predetermined rate throughout the predetermined time delay of the time-delay stage 137 and at that time the current is within the upper and lower limits. As illustrative of the practice of the invention and not in any limiting sense, it has been found that a 200–300 microsecond time interval for the time-delay circuit 137 is effective to provide desirable noise immunity while allowing minimum operating times.

Referring to FIG. 3, a vertical portion 608 of the time-current characteristic curve represents the operation of the instantaneous trip signal generator 130. The level of current termed high overcurrent can be varied by varying the reference voltage 202 or the components associated with the operational amplifier 345 such as the resistor 377.

While there has been illustrated and described various embodiments of the present invention, it will be apparent that various changes and modifications will occur to those skilled in the art. For example, in various specific embodiments of the present invention, the instantaneous trip signal generator 130 is modified such that different combinations and arrangements of the delay stage 137, the di/dt generator 136, and the instantaneous levels generator 133 are provided. In one specific embodiment, the instantaneous levels generator 133 is deleted and the NAND gate 139 is replaced by an inverter responsive to the signal 147. In another specific embodiment, the instantaneous levels generator 133 provides only the lower value of current signal at 143 and the NAND gate 139 is implemented by a 2-input NAND gate. In other specific embodiments, the time-delay stage 137 is driven by various signals that represent a predetermined relationship between one or more current levels and/or the rate of change of the current. It is intended in the appended claims to cover all such changes and modifications as fall within the true spirit and scope of the present invention.

What is claimed and desired to be secured by Letters Patent of the United States is:

1. A control circuit responsive to a signal related to the current in an alternating-current line for operating a device upon the occurrence of overcurrent in the line, said control circuit comprising:
   trip signal generator means responsive to the current signal for producing a trip signal when the rate of change of the current in the line exceeds a selected rate throughout a predetermined time interval and when the current after the end of the predetermined time interval satisfies a predetermined relationship, the predetermined time interval being measured from the time the rate of change of the current exceeds the selected rate; and
   means responsive to said trip signal for operating the device.

2. The control circuit of claim 1 wherein said predetermined relationship is defined by the current exceeding a predetermined level.

3. The control circuit of claim 1 further comprising second trip signal generator means responsive to the current signal for producing a trip signal in response to overcurrent in the line after the passage of a time delay that is inversely related to the overcurrent in the line.

4. The control circuit of claim 3 further comprising power supply means for providing a source of energy, said device operating means comprising switch means responsive to said trip signal for applying energy from said power supply means for operating the device.

5. The control circuit of claim 4 further comprising means for providing an output current proportional to the current in the line, the current signal being derived from said output current, said power supply means further comprising an energy storage means for storing energy derived from said output current.

6. The control circuit of claim 5, wherein said energy storage means is responsive to the generation of a trip signal by said second trip signal generator means such that the energy stored by said energy storage means is increased, said control circuit comprising time delay means responsive to a trip signal from said second trip signal generator means for permitting the amount of stored energy in said energy storage means to be increased before the trip signal is applied to said switch means to cause said switch means to apply stored energy from said energy storage means to operate the device.

7. The control circuit of claim 1 wherein said predetermined relationship is defined by the current exceeding a first level and being less than a second level.

8. The control circuit of claim 7 wherein said trip signal generator further comprises:
   level detector means responsive to the current signal for detecting the instantaneous value of the current in the line and for producing a window signal when the instantaneous value of the current in the line is greater than the first level and less than the second level;
   differentiating means for detecting the rate of change of the current signal and for producing a rate signal when the rate of change of the current in the line exceeds a predetermined rate;
   time delay means responsive to the rate signal for producing a delayed rate signal when the rate signal is continuous throughout a predetermined time interval; and
   gate means for receiving the window signal and the delayed rate signal and for producing the trip signal when both the window signal and the delayed rate signal are received simultaneously.

9. The control circuit of claim 7 wherein said predetermined relationship additionally includes the rate of change of the current exceeding said selected rate.

10. The control circuit of claim 1 wherein the selected rate is determined so as to indicate at the onset of overcurrent in the line that the current if not interrupted would exceed a predetermined value, whereby a trip signal is generated with the onset of the overcurrent and the occurrence of the predetermined current relationship.

11. A control circuit for generating a trip signal in response to current above a selected threshold in an alternating-current line, said control circuit comprising:
   trip signal generating means for generating a trip signal when the rate of change of the current in the line exceeds a selected rate, said trip signal generating means comprising means for delaying generation of said trip signal until the rate of change of the current independent of the current magnitude continuously exceeds the selected rate throughout a predetermined time interval, the time interval being measured from the time the rate of change of the current exceeds the selected rate.

12. A control circuit responsive to a signal related to the current in an alternating-current line for operating a device upon the occurrence of overcurrent in the line, said control circuit comprising:
   signal generator means responsive to the current signal for producing a first signal when the current in the line has a rate of change greater than a selected rate;
   means responsive to said first signal and the current signal for delaying operation of said control circuit for a predetermined minimum time interval while substantially reducing undesired responses to false signals, said delaying means comprising means solely responsive to the continued presence of said first signal throughout said predetermined minimum time interval for generating a second signal and means responsive to said second signal and the current signal for generating a third signal; and
   switch means responsive to said third signal for operating the device.

13. A control circuit for generating a trip signal in response to overcurrent in an alternating-current line, said control circuit comprising:
   means for generating a first signal representing the instantaneous current in the alternating-current line;
   means responsive to said first signal for generating a second signal representing the rate of change of said first signal;
   means responsive to said first signal generating means for generating a third signal representing the instantaneous current signal being within a predetermined range of overcurrent; and
   means responsive to said second signal and said third signal for generating a trip signal, said trip signal generating means comprising means responsive only to said second signal for substantially reducing undesired generation of said trip signal in response to pertubation in the alternating-current line at a high frequency compared to the alternating-current frequency.

14. The control circuit of claim 12 wherein said undesired generation reducing means comprises means for delaying generation of said trip signal for a predetermined time interval.

15. The control circuit of claim 14 wherein said delaying means is responsive to said rate of change exceeding a predetermined level to initiate said predetermined time interval.

16. The control circuit of claim 14 wherein said delaying means further comprises means for resetting said predetermined time interval whenever said rate of change signal falls below said predetermined level, said predetermined time interval being restarted when said rate of change signal again exceeds said predetermined level.

* * * * *

UNITED STATES PATENT AND TRADEMARK OFFICE
CERTIFICATE OF CORRECTION

PATENT NO. : 4,605,982
DATED : Aug. 12, 1986
INVENTOR(S) : Robert H. Harner and Joseph W. Ruta It is certified that error appears in the above-identified patent and that said Letters Patent is hereby corrected as shown below:

Title page:

In the Abstract, line 12, before "maximum" insert -- a --.

Col. 3, line 42, "effect" should be -- affect --.

Col. 4, line 47, delete "block".

Col. 5, line 1, "solenoid;" should be -- solenoid, --.

Col. 6, line 6, "very" should be -- vary --.

Col. 7, line 33, "considered" should be -- controlled --.

Claim 13, col. 14, line 41, "pertubation" should be -- perturbation --.

Claim 14, col. 14, line 44, "12" should be -- 13 --.

Signed and Sealed this

Twenty-third Day of February, 1988

Attest:

DONALD J. QUIGG

*Attesting Officer*   *Commissioner of Patents and Trademarks*